Patented June 9, 1953

2,641,552

UNITED STATES PATENT OFFICE 2,641,552

DIELECTRIC MATERIAL

William J. Lies, Williamstown, Mass., assignor to Sprague Electric Company, North Adams, Mass., a corporation of Massachusetts No Drawing. Application May 1, 1950, Serial No. 159,365

4 Claims. (Cl. 106—39)

My invention relates to the manufacture of ceramic dielectric materials and more particularly refers to modified titanium dioxide bodies.

Titanium dioxide is widely used as a dielectric body. It possess high dielectric constants and low losses over a wide range of frequencies. In the fabrication of electrical condensers utilizing such ceramic bodies it is common to incorporate a small percentage of inorganic material, which serves to modify the magnitude of the temperature coefficient of dielectric constant. There are many known materials and mixtures thereof which may be used for this purpose, but many of these suffer the disadvantage of causing a deleterious effect on the other electrical characteristics of the resultant fired body, particularly the loss factor and dielectric constant.

It is an object of the present invention to produce a ceramic material possessing excellent electrical and physical characteristics. A further object is to produce a modifying material for titanium dioxide which will improve the dielectric properties of the titanium dioxide. A still further object is to produce a titanium dioxide dielectric body possessing unusual electrical properties. Additional objects will become apparent from the following description and claims.

These objects are attained in accordance with my invention by employing as a minor ingredient in ceramic dielectric materials containing titanium dioxide, a composition comprising aluminum oxide, boric oxide, silicon dioxide, calcium oxide and zirconium dioxide. Thus, the invention is concerned with a ceramic dielectric comprising a fired body containing a major amount of titanium dioxide and a minor amount of a modifying material consisting of aluminum oxide, boric oxide, silicon dioxide, calcium oxide and zirconium dioxide. In a more restricted sense my invention is concerned with a ceramic dielectric comprising a fired body containing by weight from about 80% to about 99% of titanium dioxide and from about 1% to about 20% of a modifying material consisting by weight of from 25 to 35 parts of aluminum oxide, 5 to 15 parts of boric oxide, 30 to 40 parts of silicon dioxide, 10 to 20 parts of calcium oxide and 5 to 15 parts of zirconium dioxide. In its preferred embodiment the invention is directed to a ceramic dielectric comprising a fired body containing about 95% of titanium dioxide and about 5% of a modifying material consisting of about 30.2 parts of aluminum oxide, 10.1 parts of boric oxide, 33.8 parts of silicon dioxide, 15.1 parts of calcium oxide and 10.8 parts of zirconium dioxide.

While I am not fully aware of the reasons therefore, I have found it possible to produce outstanding dielectric bodies by firing a dielectric material predominating in titanium dioxide with a modifying material containing aluminum oxide, boric oxide, silicon dioxide, calcium oxide and zirconium oxide. The resultant body will possess a high Q, a lower temperature coefficient of dielectric constant and a lower power factor than a fired pure titanium dioxide body, although the dielectric constant will be slightly lower. It may be that my modifying agent acts as a solvent for reduced titania, e. g. titanium oxides in which the ratio of titanium to oxygen is more than 0.5.

My invention is particularly valuable since it is extremely difficult to obtain 100% pure titanium dioxide and, if obtained, to retain the high oxidation state throughout the processing steps in the manufacture of an electrical condenser therewith. The modifying agent referred to above is preferably mixed, calcined and pulverized before being added to the titanium dioxide powder.

It has been found that the modified $TiO_2$ dielectric bodies of the invention are extremely valuable in commercial manufacture, since they may be produced using both commercial electrical and pigment grade titanium dioxide and may be processed in neutral or slightly reducing atmospheres, and yet have outstanding electrical characteristics.

The following examples are illustrative of my invention, and it is to be understood that variations within the scope of the foregoing general discussion may be made.

EXAMPLE 1

*Preparation of modifying agent*

The following ingredients were mixed and ball milled in water for two days:

| Material | Parts by weight | Added as— |
|---|---|---|
| $Al_2O_3$ | 30.2 | $Al_2O_3$ in powdered form that passes through 100 mesh screens. |
| $B_2O_3$ | 10.1 | $H_3BO_3$, C. P. crystals. |
| $SiO_2$ | 33.8 | $SiO_2$ in powdered form that passes through 100 mesh screens. |
| $CaO$ | 15.1 | $CaCO_3$. |
| $ZrO_2$ | 10.8 | $ZrO_2$ in powdered form that passes through 325 mesh screens. |

After ball milling, the suspension was screened through a 325 mesh screen and the water evaporated off. The dried mixture was then repulverized in the ball mill.

EXAMPLE 2

*Preparation of titanium dioxide body*

95 parts by weight of electrical grade commercial titanium dioxide was mixed with 5 parts of the pulverized agent produced according to Example 1. The mixture was pelleted to make discs approximately 0.9" in diameter and 0.1" thick. These discs were fired for five hours at 1350° C. in a slightly reducing atmosphere in a gas fired kiln. After cooling, the two sides of the discs were silvered and provided with terminals for electrical measurements. The dielectric constant at 60 cycles, 1000 cycles, and 1000 kilocycles at 25° C. was about 10,000, while the power factor at 60 cycles at 25° C. was about .1%. The insulation resistance at 500 VDC expressed in ohms per centimeter cube was about $1.0 \times 10^{14}$. The temperature coefficient of capacity of the condenser in parts per million per degree C. based on 25° C., as determined by R. M. A. specification #157A, was −730. The coefficient for commercial electrical grade titanium dioxide is −850.

EXAMPLE 3

96 parts by weight of electrical grade commercial titanium dioxide was mixed with 4 parts of the pulverized agent produced according to Example 1. The mixture was pelleted and fired for 6 hours at 1320° C. Silver electrodes were applied and the so-formed capacitor was measured. The dielectric constant and power factor were 96 and .15% respectively at 1000 cycles and 25° C.

EXAMPLE 4

96 parts of a pigment grade titanium dioxide consisting of a minimum of 97% $TiO_2$ was mixed with 4 parts of the pulverized agent produced according to Example 1. The mixture was pelleted and fired for 8 hours at 1300° C. The dielectric constant and power factor of the fired dielectric were 96 and .20% respectively at 1000 cycles and 25° C.

EXAMPLE 5

97 parts of commercial electrical grade $TiO_2$ were mixed with 3 parts of a modifying agent produced as in Example 1 but with the following composition:

| Material | Percent |
|---|---|
| $Al_2O_3$ | 32.0 |
| $B_2O_3$ | 12.5 |
| $SiO_2$ | 30.5 |
| $CaO$ | 13.1 |
| $ZrO_2$ | 11.9 |
| | 100.0 |

The mixture was pelleted as in Example 2 and fired for 7 hours at 1310° C. The resulting dielectric body had a high Q and a slightly negative temperature coefficient of dielectric constant.

It may be seen from the above data, that the titanium dioxide body produced with the modifying agent of the invention possesses outstanding chracteristics. The dielectric constant is only slightly lower than 100% titanium dioxide, while the "Q" and power factor are superior. The temperature coefficient is also much smaller than that of pure titanium dioxide.

While I have obtained excellent results with the particular modifying agents described in Example 1 and Example 5, I have found that it is possible to vary amounts of the various oxides therein within certain limits, and still retain the outstanding beneficial effects thereof. This variation may be within the range of from 25 to 35 parts by weight of aluminum oxide, from 5 to 15 parts of boric oxide, from 30 to 40 parts of silicon dioxide, from 10 to 20 parts of calcium oxide and from 5 to 15 parts of zirconium dioxide. I have disclosed the calcium oxide and boric oxide as added in the form of calcium carbonate and boric acid, respectively. It is possible to add these oxides in other forms or as the oxides themselves, if so desired.

To obtain optimum mixing of the modifying agent ingredients, it is often desirable to calcine the mixture at 1150° C., well below the temperature at which it forms a glass, and subsequently to regrind the fired agent in a ball mill, before incorporating it in the titanium dioxide body.

While the invention has been directed particularly to titanium dioxide bodies, it is contemplated that the agents described herein will also be of use in preparing fired dielectric bodies of the alkaline earth titanates, such as barium titanate, strontium titanate and magnesium titanate.

While the various oxides disclosed hereinabove have been found ideal for the purposes of the invention, it is contemplated that they may be substituted by other metal oxides within the same classification in the periodic table. For example, calcium oxide may be substituted by strontium and barium oxides, zirconium oxide may be replaced with cerium oxide, and aluminum oxide may be replaced with gallium and indium oxides.

Electrical condensers may be produced from pressed, molded extruded, and coated ceramic masses containing titanium oxide, and the agents of the invention, the dielectric bodies being fired at a temperature in the neighborhood of 1350° C., until there is obtained a dense, hard partially glassy phase body possessing the desired electrical characteristics. Electrodes may then be applied by silvering portions of the ceramic surface in the usual manner.

It has been observed that the dielectric compositions of the invention are apparently unaffected by a slight reducing atmosphere during firing, making them very desirable for commercial operations with gas-fired kilns. This observation is particularly valuable, since one of the disadvantages of conventional ceramic compositions has been an inconsistency of dielectric values, depending upon the precise atmosphere present during the firing operation. However, the dielectric bodies may be fired in neutral and oxidizing atmospheres with the same outstanding results.

Furthermore the dielectric composition of the invention has a broad maturing temperature range, from about 1280° C. to about 1380° C. The herein disclosed modifying material also permits a broad vitrifying range for the dielectric composition and appears to eliminate substantial crystal growth within the composition. The firing period may be extended considerably without deleteriously effecting the properties of the final body.

It has been found essential to include each of the specified oxides in the modifying agent to obtain the combination of outstanding dielectric properties in the final fired body. Elimination of one or more of them, or a susbtantial departure from the specified ratio therebetween, will cause a reduction of dielectric constant, an increase in temperature coefficient or other undesired change.

As many apparently widely different embodiments of this invention may be made without departing from the spirit and scope hereof, it is to be understood that the invention is not limited to its specific embodiments except as defined in the appended claims.

What is claimed is:

1. A ceramic dielectric comprising a fired body containing from about 80% to about 99% of titanium dioxide and from about 1% to about 20% of a modifying agent consisting of from 25 to 35 parts of aluminum oxide, 5 to 15 parts of boric oxide, 30 to 40 parts of silicon dioxide, 10 to 20 parts of calcium oxide and 5 to 15 parts of zirconium dioxide.

2. A ceramic dielectric comprising a fired body containing about 95% of titanium dioxide and about 5% of a modifying agent consisting of about 30.2 parts of aluminum oxide, 10.1 parts of boric oxide, 33.8 parts of silicon dioxide, 15.1 parts of calcium oxide and 10.8 parts of zirconium dioxide.

3. A ceramic dielectric comprising a fired body containing about 96 parts of titanium dioxide of at least 97% purity and about 4 parts of a modifying agent consisting of about 30.2% aluminum oxide, 10.1% boric oxide, 33.8% silicon dioxide, 15.1% calcium oxide and 10.8% zirconium dioxide.

4. A ceramic dielectric comprising a fired body containing about 97 parts of commercial titanium dioxide admixed with three parts of a modifying agent having approximately the following composition: 32% aluminum oxide, 12.5% boric oxide, 30.5% silicon dioxide, 13.1% calcium oxide and 11.9% zirconium dioxide.

WILLIAM J. LIES.

References Cited in the file of this patent

UNITED STATES PATENTS

| Number | Name | Date |
| --- | --- | --- |
| 2,277,736 | Wainer et al. | Mar. 31, 1942 |
| 2,330,950 | Bugel | Oct. 5, 1943 |

FOREIGN PATENTS

| Number | Country | Date |
| --- | --- | --- |
| 865,642 | France | 1941 |